Oct. 29, 1968   J. A. HJALSTEN ET AL   3,407,889
DRILL BIT WITH AN ECCENTRIC CUTTING EDGE PORTION
Filed March 15, 1967   2 Sheets-Sheet 2

United States Patent Office 3,407,889
Patented Oct. 29, 1968

3,407,889
DRILL BIT WITH AN ECCENTRIC CUTTING EDGE PORTION
John Anders Hjalsten and Harry Artur Ingvar Wiredal, Sandviken, Sweden, assignors to Sandvikens Jernverks AB, Sandviken, Sweden, a corporation of Sweden
Filed Mar. 15, 1967, Ser. No. 623,403
Claims priority, application Sweden, Mar. 21, 1966, 3,719/66
3 Claims. (Cl. 175—263)

ABSTRACT OF THE DISCLOSURE

A drill comprising a drill rod, a drill bit having an eccentric cutter bit and a connecting sleeve having a socket in which the cutter bit shank is supported in either of two positions between limiting contact surfaces, in one of said positions the cutter bit being in alignment with the casing for drilling and in the other of said positions the cutter bit being tilted at an angle to the casing for withdrawal therethrough.

---

For drilling through loose earth materials and fissured rock a drill often is used, preferably a percussion drill, which consists of a drill rod and a casing tube surrounding it. The drill rod and the casing tube are driven in simultaneously by rotating the drill rod, the drill rod being provided with a drill bit on which an eccentric cutting edge portion protrudes laterally so much that the range of action of the drill bit is as great as or greater than the outer radius of the casing tube. During drilling the drill bit should be fixed in relation to the drill rod, and during the rotation of the drill the drill bit should rest on and slide along the inner wall of the tube at a surface portion situated inside the tube opposite to the eccentric protruding portion. As the drill bit in this position occupies a diameter which is greater than the inner diameter of the tube there must be special arrangements in order to make it possible to extract the drill bit from the tube when drilling is finished. For this purpose drill bits of this type are made transversally slidable or contractable in different ways so that during extraction they occupy a diameter smaller than the inner diameter of the casing tube. Earlier suggested constructions have been found not to satisfy all requirements for functional reliability and the present invention relates to an improved eccentric drill bit of very simple construction adapted for the greatest possible functional reliability.

The invention is more fully described hereinafter in connection with the accompanying drawings in which.

Figure 1:
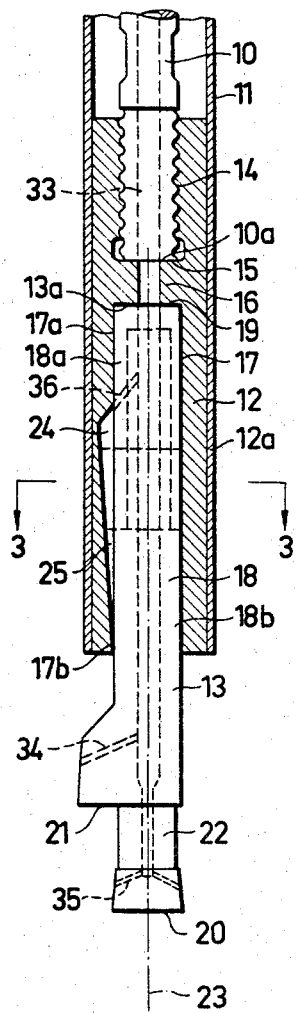
FIG. 1 is a longitudinal section with parts shown in elevation on the line 1—1 of FIG. 3 of the fore part of a drill according to the invention, shown in position for drilling.
Figure 3:
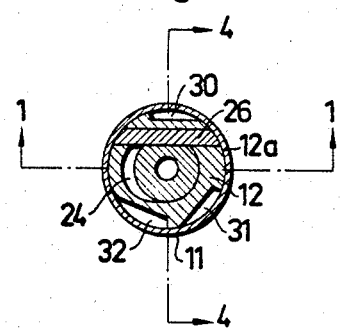
FIG. 3 is a cross section along line 3—3 of FIG. 1.
Figure 5:
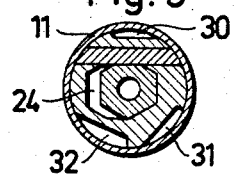
Figure 6:
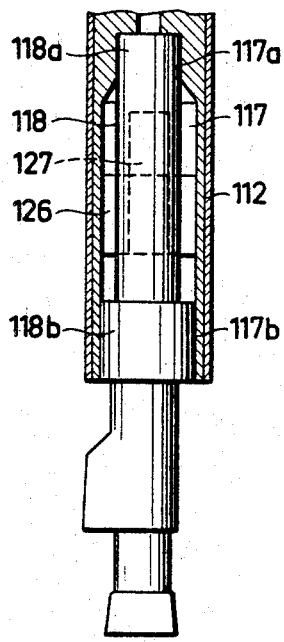
Figure 4:
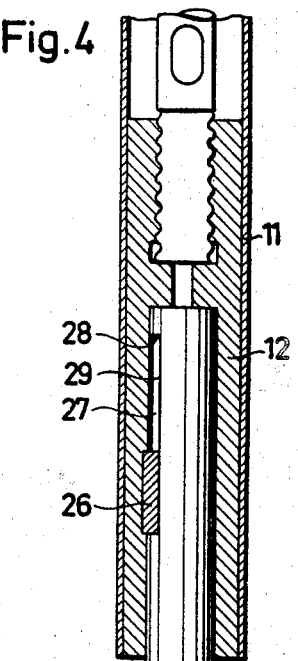
FIG. 4 is a longitudinal section along line 4—4 in FIG. 3, turned 90° in relation to the section shown in FIG. 1.
Figure 7:
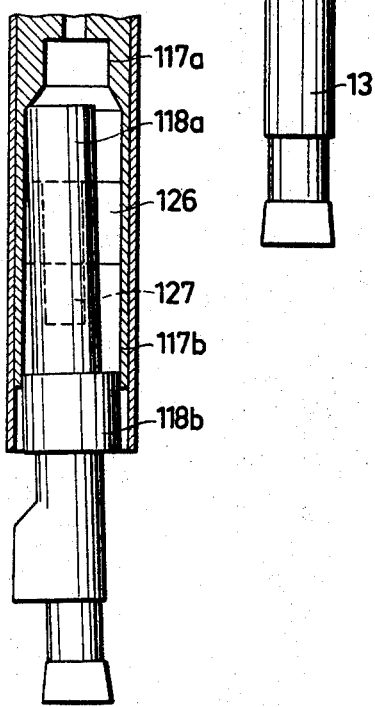

FIG. 5, a modified form of the drill in the same cross section as in FIG. 3;

FIG. 6, a modified form of the drill in the same longitudinal section as in FIG. 1 with the drill in position for drilling;

FIG. 7, the same longitudinal section as in FIG. 6, but with the drill in position for extraction.

FIG. 1 shows the fore part of a drill comprising a drill rod 10 and a casing tube 11 surrounding the rod, which are connected in the known way at their rear ends to a drilling machine (not shown) for simultaneous driving into the ground. During the drilling the drill rod rotates, the tube being driven forward without rotation. The drill bit is formed of a guiding sleeve 12 and a cutter bit 13. In the rear part as regarded in the drilling direction, the sleeve 12 is connected by a threaded coupling 14 to the drill rod 10, the end surface 10a of which bears against a contact surface 15 on an intermediate partition 16 in the sleeve 12. The fore part of the sleeve as regarded in the drilling direction is provided with an axial bore 17. In this bore the cutter bit 13 is inserted with the rear end surface 13a of the rear rod-shaped portion or shank 18 abutting against the contact surface 19 on the intermediate partition 16. As an alternative to the partition 16 with its contact surfaces 15 and 19 it is possible to have shoulder abutments shaped as projections on the rod 10 and the cutter bit 13 bearing against the end surfaces of the sleeve 12.

At its fore end the cutter bit is provided with a central cutting edge portion 20 and an eccentric cutting edge portion 21, the first mentioned being on a protruding pilot portion 22 by which the starting of a drilling is facilitated. As an alternative the cutting edge portions 20 and 21 may be placed on the same level and form a single eccentric cutting edge portion. The cutting edges can be of a well known type and have not been illustrated.

Figure 2:
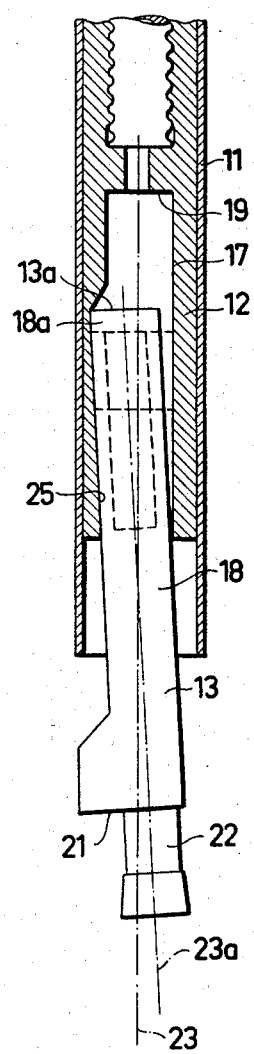
FIG. 2 is a longitudinal section similar to FIG. 1 but with the drill in position for extraction.

The bore 17 is shaped at its rear portion 17a and its fore portion 17b to tightly surround the corresponding portions 18a and 18b on the shank of the cutter bit when the cutter bit is situated in the drilling position shown in FIG. 1. An intermediate portion of the bore 17 is provided with a recess 24 which has a bottom 25 which approaches the drill axis forwardly in the drilling direction. This recess permits the cutter bit in the extraction position shown in FIG. 2 to be inclined in relation to the drill axis. The recess 24 is situated on the same side of the axis as the protruding portion 21 of the cutter bit.

In order to allow axial movement of the cutter bit in relation to the guiding sleeve 12 while retaining the cutter bit in the sleeve, the device is provided with a locking arrangement which limits the axial movement in the longitudinal direction. The locking arrangement consists of a locking key 26 which is secured in the sleeve and protrudes into a longitudinal recess 27 in the rod part of the cutter bit. At the upper end of the recess 27, a shoulder 28 is formed which serves as a stop for the key 26 in the position shown in FIG. 2. The key 26 also serves to rotate the cutter bit with the rotation of the drill rod by the contact with the plane longitudinal bottom surface 29 of the recess 27. In the illustrated embodiment the remaining parts of the bore and the rod part of the cutter bit are circular in cross-section but as an alternative they can be manufactured with a polygonal cross-section as shown in FIG. 5, whereby the turning moment between the sleeve and the bit will be transmitted more effectively than with with only the key 26 and the recess 27. Of course, the locking device can be made in some other way which will be obvious to a person skilled in the art as for example in the form of a pin placed in the radial direction through the wall of the sleeve into a bore in the cutter bit.

The sleeve 12 is provided with longitudinal external grooves 30, 31, 32 (FIG. 3) which form passages for drill cuttings and flushing medium. The remainder of the surface of the sleeve 12 adjoins the inner surface of the tube 11, the diameter of the sleeve of course being a little less than that of the tube in order to allow the rotation of the sleeve relative to the tube and also the relative axial movement thereof during extraction. It is of special importance that the sleeve 12 at the position 12a diametrically opposite the protruding cutting edge portion 21 follows the inner surface of the tube 11 so that, during drilling the eccentric cutting edge portion is forced radially outwardly. The cutter bit must be supported against the sleeve at the position 12a which slides around the tube at the same time being in contact with the inner surface thereof.

The drill rod is provided with a flushing channel 33 with branches 34, 35 to the cutting edge portions. Moreover, the flushing channel has an extra branch 36 at the recess 24, in order to keep the latter clear of cuttings.

In the position of the cutter bit 13 shown in FIG. 1 the cutter bit is in drilling position. The inner end surface 13a of the bit contacts the contact surface 19 and the cutter bit cannot move sidewards as the portions 18a and 18b of the shank 18 are closely surrounded by the corresponding portions 17a and 17b of the sleeve. The sleeve rests with its peripheral surface portion 12a on the inner surface of the tube 11, and thereby the drill bit is guided during the rotation so that the cutting edge portion 21 protrudes radially to or outside of the elongation of the outer surface of the tube 11. In this way the eccentric cutting edge drills a hole which is as great as or greater than the outer diameter of the tube 11. The tube 11 follows the axial movement of the drill and forms successively a casing for the drilled hole, whereby the hole is prevented from being filled by loose material from the wall which makes drilling through earth material or fissured rock possible.

After drilling the drill rod is to be extracted from the tube casing. For the extraction of the rod the sleeve 12 is lifted and cutter bit 13 takes the position shown in FIG. 2, in which the rear part 18a falls sidewardly into the recess 24 so that its axis 23a forms an angle with the drilling axis 23. In this position the cutter bit hangs with the shoulder 28 in contact with the upper surface of the key 26. By this inclination of the cutter bit the cutting edge portion 21 is retracted to a position inside the inner surface of the tube 11 whereby extraction of the drill through the tube can be done.

FIG. 6 shows a modified embodiment of the drill bit. The bore 117 has a rear bore portion 117a which has a smaller diameter than the fore bore portion 117b. Both bore portions 117a and 117b are coaxial and as in the preceding example they can be cylindrical or polygonal. The shank 118 of the cutter bit has a rear portion 118a which fits into the bore portion 117a and a fore thicker portion 118b which fits into the bore portion 117b so that the cutter bit in the drilling position shown in FIG. 6 is fixed in the sleeve 112. In the extraction position shown in FIG. 7 the rod portion 118b remains surrounded by the bore portion 117b while the rod portion 118a lies below the bore portion 117a so that the cutter bit can be tilted. The axial movement of the cutter bit is limited in the same way as in the drill shown in FIG. 1 with a locking key 126 which engages a recess 127 in the shank of the drill bit.

The portion 118b can be made either in one piece with the cutter bit or mounted thereon by pressing on a separate collar on the rear portion of the cutter bit. It should be observed that both of the embodiments of FIGS. 1 and 6 aim at having the best possible fit between the cutter bit and the sleeve at the mouth of the latter that is, between the portion 17b and 18b or 117b and 118b respectively in order to prevent cuttings from entering into the sleeve.

The advantage of the described drill bit compared with previously known drill bits is its structural simplicity and functional reliability. The drill bit has only one movable part viz the cutter bit 13 and as the latter is situated in a bore directed forwards in the guiding sleeve 12 cuttings are prevented from collecting in the bore and disturbing the cooperation between the bit and the sleeve. Usually the described drill is used for drilling downwards whereby the bore is directed downwards which contributes to prevent collection of cuttings in it.

We claim:

1. Drill bit having an eccentric cutting edge portion for driving a casing tube into the ground, said drill bit comprising a cutter bit with at least one eccentric cutting edge and a rod shaped shank and a guiding sleeve which in one end is adapted for attachment to a drill rod and in the opposite end has an axial bore in which the shank of the cutter bit is inserted and is axially slidable between two end positions defined by cooperating abutting contact surfaces on the cutter bit and the sleeve and is non-rotatable in relation to said sleeve, the bore at its fore and rear portion having such cross-sectional shapes that when the cutter bit is situated in the inner of said end positions the sleeve tightly surrounds the shank at said portions, the bore at an intermediate portion being wider than the cross section of the shank whereby the cutter bit when at the outer end position can be tilted in relation to the drilling axis and the eccentric cutting edge portion brought within the casing tube.

2. Drill bit according to claim 1 in which said bore has the same cross section at its fore and rear portions and the intermediate portion of said bore has the shape of a recess in the wall of the bore.

3. Drill bit according to claim 1, in which the fore portion of said bore has a greater diameter than the rear portion and that the intermediate portion of the bore has the same diameter as said fore portion.

References Cited

UNITED STATES PATENTS

| | | | |
|---|---|---|---|
| 631,517 | 8/1899 | Worsley | 175—398 |
| 1,869,892 | 8/1932 | Grove | 175—257 X |
| 2,069,603 | 2/1937 | Earley | 175—263 |
| 2,558,227 | 6/1951 | Yancey | 175—257 X |
| 2,799,475 | 7/1957 | Harlan | 175—398 X |
| 3,199,616 | 8/1965 | Hjälsten | 175—398 X |
| 3,373,828 | 3/1968 | Cleary | 175—398 X |

NILE C. BYERS, JR., *Primary Examiner.*